United States Patent
Lee et al.

(10) Patent No.: US 12,540,685 B2
(45) Date of Patent: Feb. 3, 2026

(54) INTERNAL TYPE ELECTRONICALLY CONTROLLED VALVE ASSEMBLY AND ELECTRONICALLY CONTROLLED DAMPER INCLUDING THE SAME

(71) Applicant: HL Mando Corporation, Pyeongtaek-si (KR)

(72) Inventors: Jongsun Lee, Yongin-si (KR); Wonbeen Im, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 172 days.

(21) Appl. No.: 18/379,734

(22) Filed: Oct. 13, 2023

(65) Prior Publication Data
US 2025/0020235 A1    Jan. 16, 2025

(30) Foreign Application Priority Data
Jul. 12, 2023  (KR) .................. 10-2023-0090189

(51) Int. Cl.
*F16F 9/34* (2006.01)
*F16F 9/46* (2006.01)
*F16K 31/40* (2006.01)

(52) U.S. Cl.
CPC .............. *F16K 31/408* (2013.01); *F16F 9/34* (2013.01); *F16F 9/464* (2013.01)

(58) Field of Classification Search
CPC .. F16K 31/408; F16K 27/029; F16K 31/0655; F16F 9/34; F16F 9/46; F16F 9/464; F16F 9/465; B60G 13/06
See application file for complete search history.

(56) References Cited

U.S. PATENT DOCUMENTS

| | | | | |
|---|---|---|---|---|
| 9,550,545 | B2 * | 1/2017 | Murakami | B62K 25/28 |
| 10,876,590 | B2 * | 12/2020 | Miwa | F16F 9/464 |
| 2013/0015028 | A1 * | 1/2013 | Heyn | F16F 9/464 |
| | | | | 188/322.13 |
| 2017/0328440 | A1 * | 11/2017 | Sakuta | F16F 9/464 |
| 2018/0245660 | A1 * | 8/2018 | Yamashita | F16F 9/36 |
| 2018/0355941 | A1 * | 12/2018 | Yuno | F16F 9/461 |
| 2021/0207679 | A1 * | 7/2021 | Yamashita | F16F 9/465 |
| 2021/0246960 | A1 * | 8/2021 | Yamaoka | F16F 9/512 |

FOREIGN PATENT DOCUMENTS

| | | |
|---|---|---|
| DE | 10 2006 041 205 A1 | 3/2008 |
| DE | 10 2016 221 896 A1 | 5/2018 |

OTHER PUBLICATIONS

Office Action issued on Apr. 10, 2024 for corresponding German Patent Application No. 10 2023 210 147.5 along with an English machine translation (20 pages).

* cited by examiner

*Primary Examiner* — Marina A Tietjen
(74) *Attorney, Agent, or Firm* — Hauptman 8am, LLP

(57) ABSTRACT

An internal type electronically controlled valve assembly includes a main poppet retainer formed in a disc shape with a rim protruding downward and disposed horizontally between a main poppet and a control disk. The internal type electronically controlled valve assembly is configured such that, during a compression stroke, a working fluid introduced through a hollow hole of a main sheet passes between the control disk and the main poppet retainer, reducing the pressure, and then flows into a pilot passage formed in the main poppet, thereby significantly reducing the pressure of a compression pilot chamber.

20 Claims, 7 Drawing Sheets

Improvement in Reb. Lag

INTERNAL TYPE ELECTRONICALLY CONTROLLED VALVE ASSEMBLY AND ELECTRONICALLY CONTROLLED DAMPER INCLUDING THE SAME

CROSS-REFERENCE TO RELATED APPLICATION

This application claims the benefit of Korean Patent Application No. 10-2023-0090189 filed on Jul. 12, 2023, in the Korean Intellectual Property Office, the entire disclosure of which is incorporated herein by reference for all purposes.

TECHNICAL FIELD

The present disclosure relates to an internal type electronically controlled valve assembly and an electronically controlled damper including the same, and, more specifically, to an internal type electronically controlled valve assembly and an electronically controlled damper including the same that are capable of providing a more comfortable ride by solving the problem that rebound lag occurs when a damping force becomes progressive at a high flow rate in a hard mode during a compression stroke.

BACKGROUND

An internal type electronically controlled damper has a structure in which a damping force is varied by changing a size of an orifice connected to a pilot chamber by moving a spool based on current. However, such a structure has a problem in that the size of the orifice changes depending on the current so that a damping force rapidly increases depending on a flow rate. In addition, because precision processing is required for smooth movement of a spool, the cost of the internal type electronically controlled damper is high. Further, the internal type electronically controlled damper is vulnerable to foreign substances and requires a separate process for adjusting the initial position of the spool.

SUMMARY

The present disclosure has been made to solve the aforementioned problems, and the purpose thereof is to provide an internal type electronically controlled valve assembly and an electronically controlled damper including the same that are capable of providing a more comfortable ride by resolving the problem that rebound lag occurs when a damping force becomes progressive at a high flow rate in a hard mode during a compression stroke.

In some embodiments, an internal type electronically controlled valve assembly includes: an outer housing that is configured to move up and down inside a cylinder and partitions the cylinder into an upper chamber and a lower chamber; a solenoid valve at a top of an inner space of the outer housing; an inner housing disposed below the solenoid valve inside the outer housing to form a main flow passage through which the upper chamber and the lower chamber of the cylinder communicate with each other; a main poppet disposed movably up and down inside the inner housing to open and close the main flow passage; a pilot poppet having at least a portion accommodated in an upper part of the main poppet, the pilot poppet being configured to adjust an opening force of the main flow passage based on a control current applied to the solenoid valve; a main sheet having a hollow hole at a center of the main sheet and coupled to an open lower end of the inner housing to limit a downward movement of the main poppet; a control disk having a ring shape and disposed horizontally above the main sheet; and a main poppet retainer having a disc shape with a rim protruding downward and disposed horizontally between the main poppet and the control disk. The internal type electronically controlled valve assembly is configured such that, during a compression stroke, a working fluid introduced through the hollow hole of the main sheet passes between the control disk and the main poppet retainer, reducing the pressure, and then flows into a pilot passage formed in the main poppet.

The main poppet retainer includes a disc-shaped body with a fitting hole formed in the center and a protrusion protruding downward along the rim of the disc-shaped body.

The protrusion includes an inner circumferential surface inclined outward and downward from a bottom of the rim of the body; and a bottom surface extending outward from the inner circumferential surface.

A fitting member in a rod shape with a predetermined length extends in a center of the lower surface of the main poppet, and the fitting member is inserted into a fitting hole formed in a body of the main poppet retainer and a coupling hole formed in the center of the control disk.

The diameter of the main poppet retainer is smaller than a diameter of the control disk, and the main poppet retainer is disposed to be spaced apart from the control disk.

The internal type electronically controlled valve assembly further includes a soft valve coupled to the lower part of the outer housing.

The main flow passage is formed along an outer through hole formed in the outer housing and a first inner through hole formed at a height corresponding to that of the outer through hole in the inner housing and is configured to be opened and closed based on the pressure of the working fluid pushing the main poppet upward.

A tension pilot chamber is formed between an inner circumferential surface of the inner housing and a side portion of the main poppet, and the internal type electronically controlled valve is configured such that, during a tension stroke, as the pilot poppet moves up and down based on the control current, the opening force of the main flow passage may be adjusted.

A compression pilot chamber is formed on the upper side of the pilot poppet, and the internal type electronically controlled valve is configured such that, during a compression stroke, the opening force of the main flow passage is controlled by the force supported by the pilot poppet based on the control current.

The main poppet includes an accommodating part for accommodating the pilot poppet, a main poppet body in which a main poppet passage forming a pilot passage is formed, and a working fluid acting portion that extends from the lower end of the main poppet body and is configured to be pressurized by the working fluid to open and close the main flow passage.

The main poppet passage include a horizontal pilot passage communicating with the tension pilot chamber, a first vertical pilot passage having a lower end connected to the horizontal pilot passage and an upper end connected to the accommodating part, and a second vertical pilot passage penetrating the main poppet body in a vertical direction.

In response to the pilot poppet being pushed upward, the first vertical pilot passage communicates with the second vertical pilot passage.

The pilot poppet includes a plunger rod support on which an end of the plunger rod of the solenoid valve is seated and a guide passage through which the first vertical pilot passage communicates with the second vertical pilot passage.

The working fluid acting portion includes a guide wall protruding downward from the bottom surface of the main poppet and a guide groove radially inward of the guide wall.

During a tension stroke, an outer circumferential surface of the guide wall is configured to be pressed by a working fluid, and, during a compression stroke, the guide groove is configured to be pressed by the working fluid.

The outer circumferential surface of the guide wall slopes upward toward an outer side of the main poppet in a radial direction.

In some embodiments, an internal type electronically controlled valve assembly includes: an outer housing that is configured to move up and down inside a cylinder and partitions the cylinder into an upper chamber and a lower chamber; an inner housing disposed inside the outer housing to form a main flow passage through which the upper chamber and the lower chamber of the cylinder communicate with each other; a main poppet disposed movably up and down inside the inner housing to open and close the main flow passage; a pilot poppet having at least a portion accommodated in an upper part of the main poppet and adjusting an opening force of the main flow passage based on a control current applied to a solenoid valve; a main sheet having a hollow hole formed in a center of the main sheet and coupled to an open lower end of the inner housing to limit a downward movement of the main poppet; a control disk having a ring shape and disposed horizontally above the main sheet; and a main poppet retainer disposed horizontally between the main poppet and the control disk and having a disc shape with a rim protruding downward to allow a working fluid introduced through the hollow hole of the main sheet and having a reduced pressure to flow into a pilot passage formed in the main poppet during a compression stroke.

The main flow passage is formed along an outer through hole formed in the outer housing and a first inner through hole formed at a height corresponding to that of the outer through hole in the inner housing and is configured to be opened and closed based on the pressure of the working fluid pushing the main poppet upward.

The main poppet retainer includes a disc-shaped body with a fitting hole formed in a center of the main poppet retainer and a protrusion protruding downward along the rim of the body; a diameter of the main poppet retainer is smaller than a diameter of the control disk; and the main poppet retainer is disposed to be spaced apart from the control disk.

In some embodiments, an electronically controlled damper includes the internal type electronically controlled valve assembly described above.

Advantages and/or features of the present disclosure and methods of achieving them will be clearly understood with reference to the embodiments described below in detail with the appended drawings.

However, the present disclosure is not limited to the features in the embodiments disclosed below and may be implemented in various other forms. Each embodiment disclosed in this specification is provided only to make the present disclosure complete and to allow a person having ordinary skill in the art to fully understand the scope of the present disclosure, and it should be noted that the present disclosure is defined only by the scope of each of the claims.

According to the above-described solutions to the problems, the present disclosure has the following effects.

According to the present disclosure, because a main poppet retainer formed in a disc shape with a rim protruding downward and disposed horizontally between a main poppet and a control disk is included, during a compression stroke, a working fluid introduced through a hollow hole of a main sheet passes between the control disk and the main poppet retainer, reducing the pressure, and then flows into a pilot passage formed in the main poppet, thereby significantly reducing the pressure of a compression pilot chamber.

Accordingly, it is possible to prevent rebound lag during a compression stroke, thereby preventing energy loss during a tension stroke and achieving a stable driving of a vehicle.

DETAILED DESCRIPTION

Hereinafter, desirable embodiments of an internal type electronically controlled valve assembly and an electronically controlled damper including the same according to the present disclosure will be described in detail based on the accompanying drawings. For reference, interpretation of terms or words used in this specification and the accompanying claims should not be limited to ordinary or dictionary meanings, and the terms or words should be interpreted with meanings consistent with the technology of the present disclosure based on the principle that an inventor can appropriately define meanings of terms to best describe his/her invention. In addition, features shown in the embodiments and the drawings in the specification are only the most preferred embodiments of the present disclosure, and do not show all of the technology of the present disclosure. Therefore, it should be understood that the features may be substituted with various equivalents and modifications at the time of filing the present application.

Figure 1:
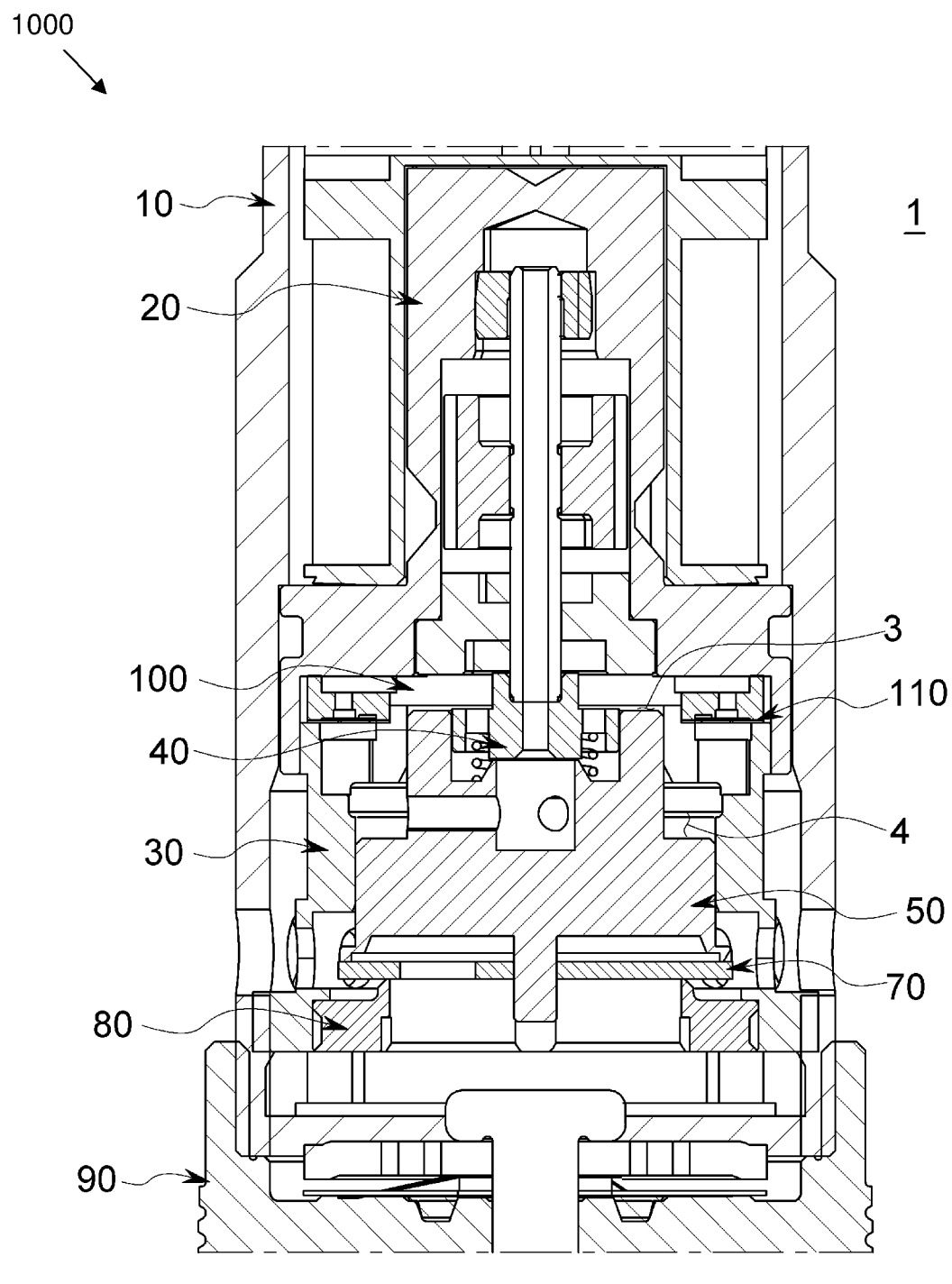
FIG. 1 is a sectional view of an internal type electronically controlled valve assembly employed in an electronically controlled damper according to the related art.

FIG. 1 is a sectional view of an internal type electronically controlled valve assembly employed in an electronically controlled damper.

As shown in FIG. 1, an internal type electronically controlled valve assembly 1000 includes an outer housing 10, a solenoid valve 20, an inner housing 30, a pilot poppet 40, a main poppet 50, a control disc 70, a main sheet 80, a soft valve 90, a top cover 100, and a check valve 110.

The internal type electronically controlled valve assembly 1000 includes pilot chambers 3 and 4 based on a compression stroke and a tension stroke, respectively, and adjusts an opening force of a main flow passage by controlling the pressure of the pilot chambers 3 and 4 based on each stroke.

Here, a hard damping force is controlled by controlling the pressure of the pilot chambers 3 and 4, and a soft damping force is controlled by tuning the soft valve 90.

Figure 2:
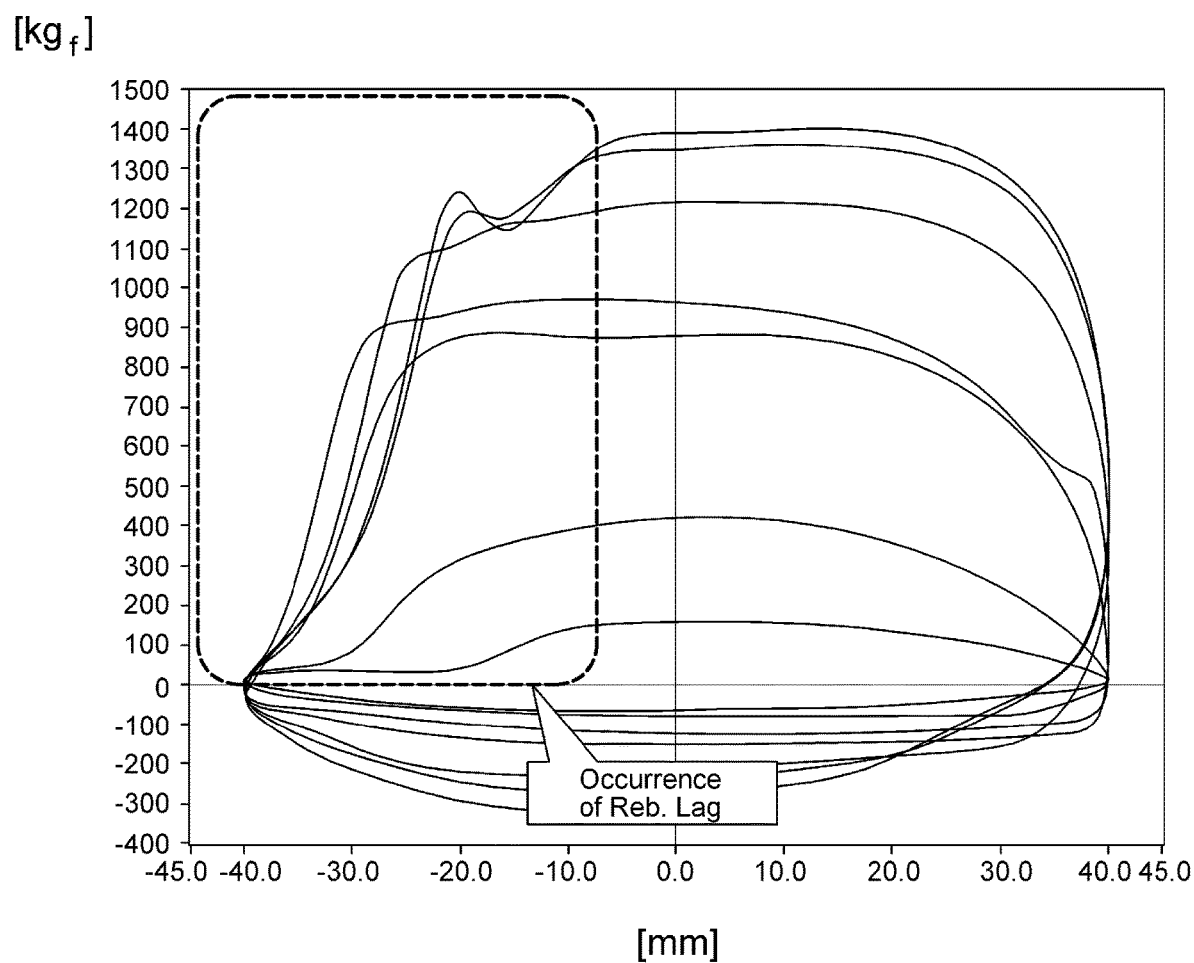
FIG. 2 is an F-S diagram showing that rebound lag occurs when a damping force of the internal type electronically controlled valve assembly in FIG. 1 becomes progressive at a high flow rate in a hard mode during a compression stroke.

FIG. 2 is an F-S (damping force-stroke) diagram showing that rebound lag occurs when a damping force of the internal type electronically controlled valve assembly in FIG. 1 becomes progressive at a high flow rate in a hard mode during a compression stroke.

The horizontal axis in FIG. 2 indicates a vertical displacement of a piston rod inside a cylinder of a damper to which the internal type electronically controlled valve assembly 1000 is assembled.

In addition, the vertical axis in FIG. 2 indicates the load generated by the resistance of the valve assembly mounted on the end of the piston rod, and the load generated at the end of the piston rod is measured with a load cell.

Because a flow passage connected to a compression pilot chamber 3 of the internal type electronically controlled valve assembly 1000 is maintained constant during a compression stroke, a damping force becomes progressive when a flow rate increases.

That is, a working fluid introduced through a hollow hole of the main sheet 80 passes between the control disk 70 and the main poppet 50 at a constant pressure and flows into a pilot passage formed in the main poppet 50.

As a result, the fluid cannot flow sufficiently into an upper chamber 1 of a cylinder, resulting in rebound lag in a hard mode.

Consequently, as shown in the upper left corner of the F-S diagram in FIG. 2, during a tensioning stroke, energy loss is caused, and the driving of a vehicle becomes unstable.

Thus, n internal type electronically controlled damper that is easy to assemble and in which a damping force can be easily controlled has been proposed.

Figure 3:
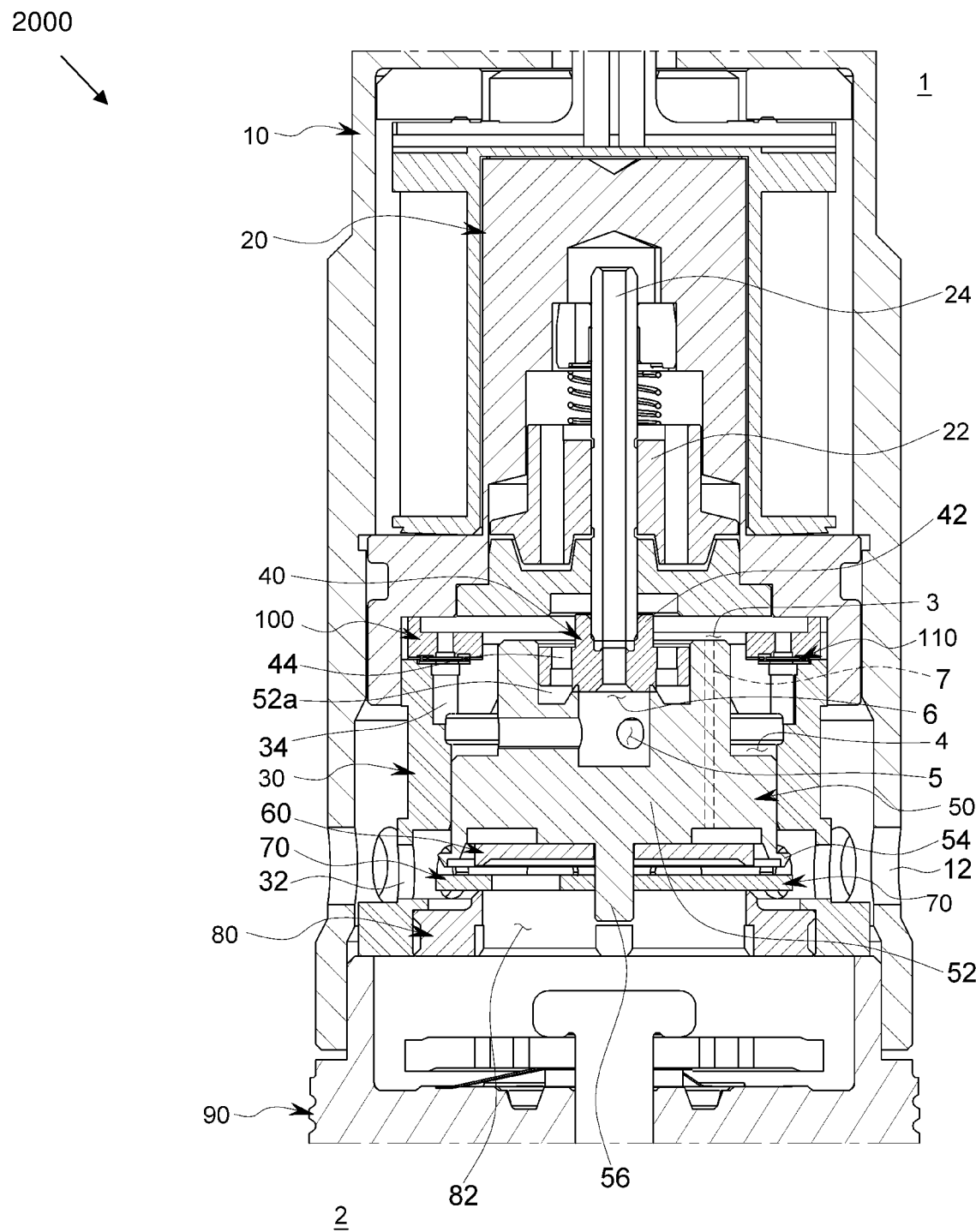
FIG. 3 is a sectional view of an internal type electronically controlled valve assembly employed in the electronically controlled damper according to some embodiments.
Figure 4:
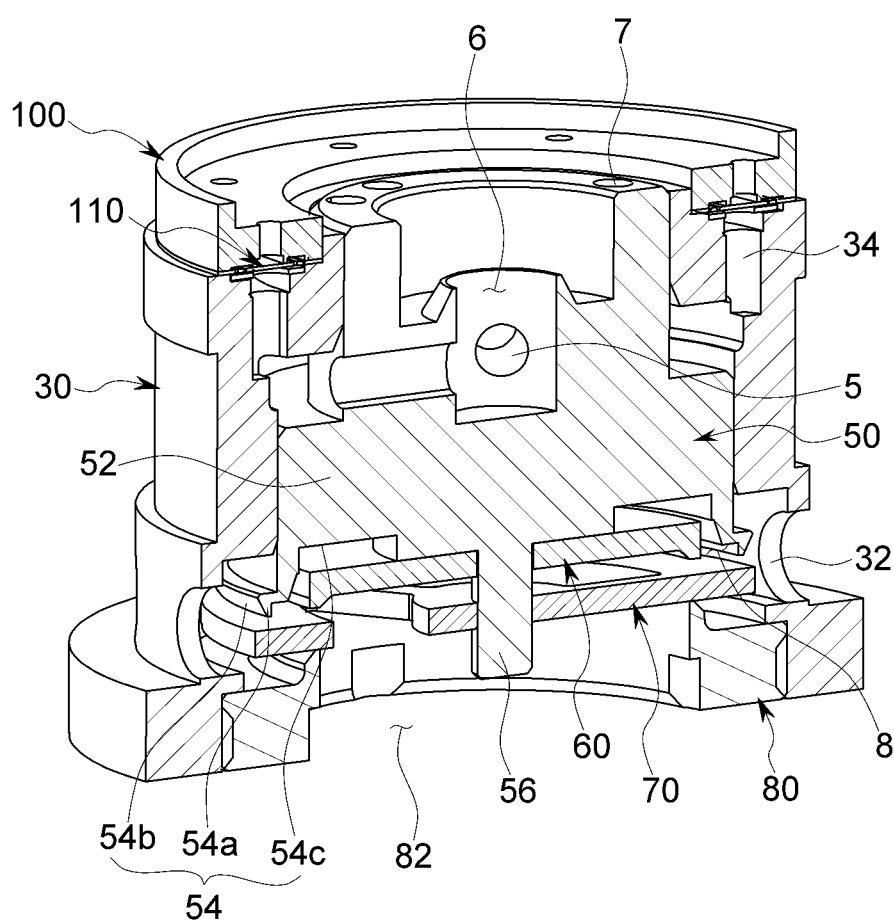
FIG. 4 is an enlarged view of an inner housing, a main poppet, a main poppet retainer, a control disk, and a main sheet in the internal type electronically controlled valve assembly of FIG. 3 according to some embodiments.
Figure 5:
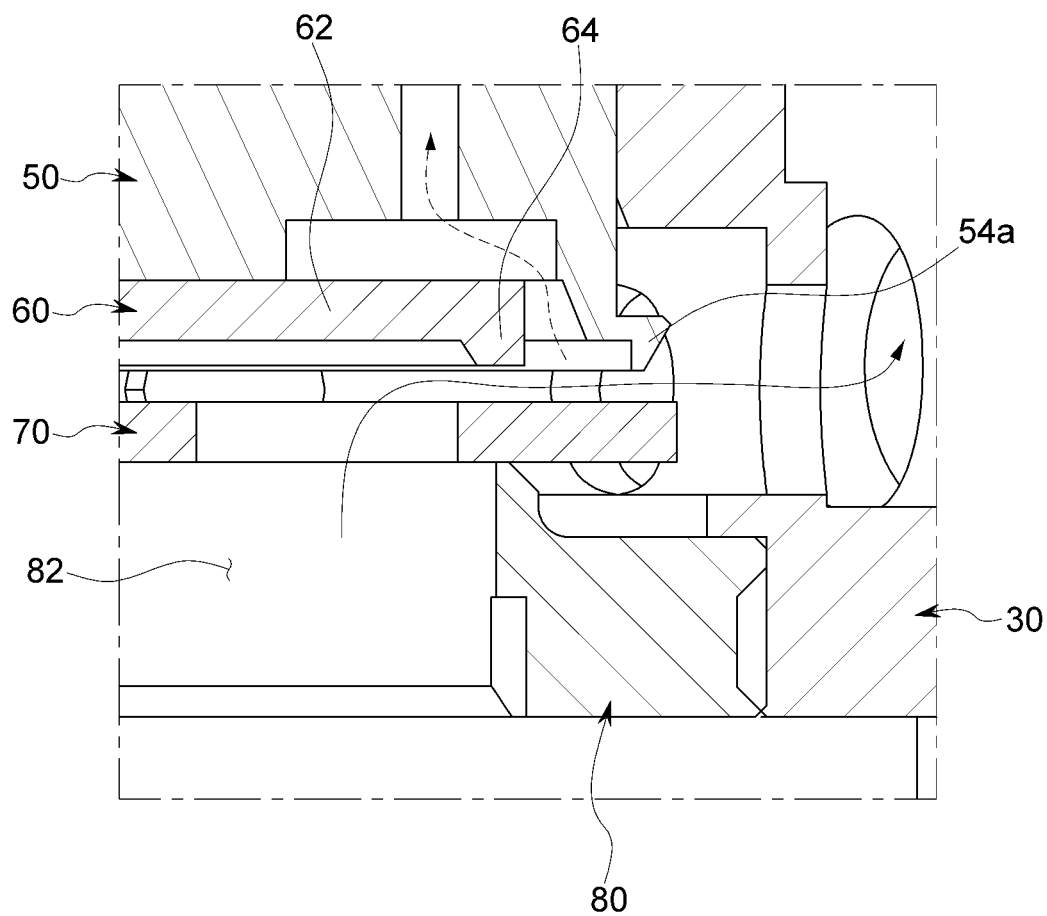
FIG. 5 is a partial enlarged view of a portion of the internal type electronically controlled valve assembly of FIG. 3 according to some embodiments to show how a working fluid introduced through a hollow hole of the main sheet passes between the control disk and the main poppet retainer, reducing the pressure, and then flows into a second vertical pilot passage formed in the main poppet.

FIG. 3 is a view of an internal type electronically controlled valve assembly employed in the electronically controlled damper according to some embodiments; FIG. 4 is an enlarged view of an inner housing, a main poppet, a main poppet retainer, a control disk, and a main sheet of the internal type electronically controlled valve assembly of FIG. 3 according to some embodiments; and FIG. 5 is a partial enlarged view of a portion of the internal type electronically controlled valve assembly of FIG. 3 according to some embodiments to show how a working fluid introduced through a hollow hole of the main sheet passes between the control disk and the main poppet retainer, reducing the pressure, and then flows into a second vertical pilot passage formed in the main poppet.

An internal type electronically controlled valve assembly 2000 according to some embodiments include an outer housing 10, a solenoid valve 20, an inner housing 30, a pilot poppet 40, a main poppet 50, a main poppet retainer 60, and a control disk 70, a main sheet 80, and a soft valve 90.

The internal type electronically controlled valve assembly 2000 according to some embodiments further include pilot chambers 3 and 4 separately formed according to a compression stroke and a tension stroke, and adjust an opening force of a main flow passage by controlling the pressure of each of the pilot chambers 3 and 4 based on the corresponding stroke.

According to some embodiments, a hard damping force is controlled by controlling the pressure of each of the pilot chambers 3 and 4, and a soft damping force is controlled by adjusting the soft valve 90.

According to some embodiments, the outer housing 10 is coupled to the end of a piston rod (not shown) and divides the inside of the cylinder into an upper chamber 1 and a lower chamber 2 while the piston rod moving up and down inside the cylinder by compression and tension.

In some embodiments, the outer housing 10 has a cylindrical shape with an inner space formed therein and is open downward.

In some embodiments, in the inner space of the outer housing 10, the solenoid valve 20, the inner housing 30, the pilot poppet 40, the main poppet 50, the main poppet retainer 60, the control disk 70, and the main sheet 80 are arranged coaxially.

In some embodiments, the soft valve 90 is coupled to an open lower end of the outer housing 10.

In some embodiments, an outer through hole 12 through which a working fluid flows in and out is formed on a side surface of the outer housing 10 along the circumference thereof.

The working fluid in the upper chamber 1 and the lower chamber 2 of the cylinder may respectively flow into the opposite chamber through a flow path formed inside the outer housing 10.

In some embodiments, the solenoid valve 20 is disposed at an uppermost part of the inner space of the outer housing 10.

In some embodiments, the solenoid valve 20 includes a plunger 22 and a plunger rod 24. The plunger rod 24 is disposed to move downward when a control current is applied to the solenoid valve 20.

An end of the plunger rod 24 is seated on a plunger rod support 42 of the pilot poppet 40, and presses the pilot poppet 40 downward according to the control current.

According to some embodiments, an opening force of a main flow passage is regulated by controlling the movement of the pilot poppet 40 through the regulation of the control current applied to the solenoid valve 20.

In some embodiments, a compression pilot chamber 3 is formed below the solenoid valve 20.

In some embodiments, the inner housing 30 is disposed below the solenoid valve 20.

In some embodiments, the inner housing 30 is fixedly disposed to the inside of the outer housing 10 by an auxiliary mold.

In some embodiments, a space is formed inside the inner housing 30, and the pilot poppet 40, the main poppet 50, the main poppet retainer 60, and the control disk 70 are coaxially disposed in the inner space.

The main sheet 80 is disposed at a lower end of the inner housing 30.

The inner housing 30 is open at the top and bottom thereof and has a cylindrical shape. The inner space of the inner housing 30 is divided into an upper portion where the compression pilot chamber 3 is formed and a lower portion where a tension pilot chamber 4 is formed.

The inner diameter of the lower portion of the inner housing 30 is larger than the inner diameter of the upper portion thereof.

An inner diameter of a portion of the upper portion of the inner housing 30 where the compression pilot chamber 3 is formed has a dimension corresponding to that of the outer diameter of a main poppet body 52 of the main poppet 50 so that the main poppet body 52 is accommodated therein and slidable thereto.

Inside the inner housing 30, the main poppet 50 is disposed to be movable in a vertical direction.

In the upper portion of the inner housing 30, the pilot poppet 40 is disposed to be movable up and down.

The main sheet 80 is disposed to limit the downward movement of the main poppet 50. The main sheet 80 is coupled to a lower end of the inner housing 30, and the control disk 70 is disposed between the main sheet 80 and the main poppet retainer 60.

The tension pilot chamber 4 is formed between an inner circumferential surface of the inner housing 30 and the main poppet body 52 in the lower portion of the inner housing 30.

The compression pilot chamber 3 is formed between the main poppet 50 and the solenoid valve 20 in the upper portion of the inner housing 30.

A first inner through hole 32 forming the main flow passage and a second inner through hole 34 forming a tension pilot passage are formed on a side surface of the inner housing 30.

The first inner through hole 32 is formed at a height corresponding to that of the outer through hole 12 of the outer housing 10.

In addition, the second inner through hole 34 is disposed above the first inner through hole 32 on a side of the inner housing 30.

During a tensioning stroke, a working fluid in the upper chamber 1 of the cylinder is introduced through the first inner through hole 32 and the second inner through hole 34 and then flows into the lower chamber 2 of the cylinder. During a compression stroke, the working fluid in the lower chamber 2 flows out to the upper chamber 1 through the first inner through hole 32.

The main poppet 50 is disposed movably up and down inside the inner housing 30 to open and close the main flow passage.

The main flow passage is formed along the outer through hole 12 of the outer housing 10, the first inner through hole 32 of the inner housing 30, a hollow hole 82 of the main sheet 80, and a valve hole (not shown) of the soft valve 90.

The main flow passage is closed in response to the main poppet 50 coming into contact with the main sheet 80 or the control disk 70 on the upper side of the main sheet 80, and is opened in response to the main poppet 50 being pushed up by the working fluid to be separated from the main sheet 80 or the control disk 70 on the upper side of the main sheet 80.

The main poppet 50 includes the main poppet body 52, a working fluid acting portion 54, and a fitting member 56.

In FIG. 4, reference numerals 100 and 110 respectively denote an upper cover and a check valve installed above the main poppet 50.

Because the diameter of the main poppet body 52 has a dimension corresponding to that of the inner diameter of the portion of the upper portion of the inner housing 30, the main poppet body 52 vertically slidable along the inner circumferential surface of the portion of the upper portion of the inner housing 30.

Meanwhile, because the inner diameter of the lower portion of the inner housing 30 is larger than the diameter of the upper portion thereof, a space is formed between the inner circumferential surface of the lower portion and the main poppet body 52, and the tension pilot chamber 4 is formed in this space.

The main poppet body 52 includes an accommodating part 52a concavely formed from an upper surface of the main poppet body 52 to accommodate the pilot poppet 40.

At least a portion of the pilot poppet 40 is accommodated and disposed movably up and down inside the accommodating part 52a.

An outer circumferential surface of the pilot poppet 40 is configured to slide along an inner circumferential surface of the accommodating part 52a.

The accommodating part 52a includes a bottom surface communicating with a first vertical pilot passage 6 to be described below.

The compression pilot chamber 3 is formed in the upper portion of the inner housing 30 between the main poppet body 52 and the solenoid valve 20.

A passage part of the main poppet 50 forming a pilot passage is formed inside the main poppet body 52.

The passage part of the main poppet 50 includes a horizontal pilot passage 5 communicating with the tension pilot chamber 4, the first vertical pilot passage 6 having a lower end connected to the horizontal pilot passage 5 and an upper end connected to the accommodating part 52a, and a second vertical pilot passage 7 penetrating the main poppet body 52 in a vertical direction.

During a tension stroke, a tensile pilot passage is formed along the outer through hole 12 of the outer housing 10, the second inner through hole 34 of the inner housing 30, the tension pilot chamber 4, the horizontal pilot passage 5, the first vertical pilot passage 6, the second vertical pilot passage 7, the hollow hole 82 of the main sheet 80, and the valve hole (not shown) of the soft valve 90.

The fitting member 56 of the main poppet 50 in a rod shape with a predetermined length extends from a center of the lower surface of the main poppet body 52.

In some embodiments, the fitting member 56 is inserted into a fitting hole 62a formed in a body 62 of the main poppet retainer 60 and a coupling hole (not shown) formed in the center of the control disk 70.

During a compression stroke, a compression pilot passage is formed along the valve hole (not shown) of the soft valve 90, the hollow hole 82 of the main sheet 80, and the second vertical pilot passage 7.

In FIG. 4, reference numeral 8 denotes an inlet of the compression pilot chamber 3. During a compression stroke, a working fluid introduced through the hollow hole 82 of the main sheet 80 passes between the control disk 70 and the main poppet retainer 60, reducing the pressure, and then flows into the second vertical pilot passage 7 formed in the main poppet 50 through the inlet 8 of the compression pilot chamber 3.

The working fluid acting portion 54 is formed at the lower end of the main poppet 50 and is pressed by a working fluid.

The working fluid acting portion 54 includes a guide wall 54a protruding downward from the lower surface of the main poppet 50 and a guide groove 54c formed inward of the guide wall 54a in a radial direction.

An outer circumferential surface of the guide wall 54a is an inclined surface 54b that slopes upward toward the outside in the radial direction.

During a tension stroke, the outer circumferential surface of the guide wall 54a is pressed radially inward by a working fluid to push the main poppet 50 up, and, during a compression stroke, the guide groove 54c is pressed upward by a working fluid to push the main poppet 50 up.

The pilot poppet 40 is disposed inside the accommodating part 52a formed in the main poppet body 52.

The pilot poppet 40 is configured to slide vertically along the inner circumferential surface of the accommodating part 52a.

An outer diameter of the pilot poppet 40 has a dimension corresponding to that of an inner diameter of the accommodating part 52a. The pilot poppet 40 has a substantially cylindrical shape.

The pilot poppet 40 includes the plunger rod support 42 on which the end of the plunger rod 24 of the solenoid valve 20 is seated. The pilot poppet 40 further includes a guide passage 44 through which the first vertical pilot passage 6 and the second vertical pilot passage 7 communicate with each other.

In some embodiments, the plunger rod support 42 is formed in the center of the inner housing 30.

The pilot poppet 40 is configured to be moved downward by the plunger rod 24 of the solenoid valve 20.

The degree of downward movement of the pilot poppet 40 is controllable and adjustable based on an amount of the control current applied to the solenoid valve 20.

During a tension stroke, as the degree of downward movement of the pilot poppet 40 is controlled by controlling the amount of the control current, the pressure in the tension pilot chamber 4 is controlled.

During a compression stroke, as the pilot poppet 40 and the main poppet 50 are pushed downward by driving of the solenoid valve 20 while the lower surface of the pilot poppet 40 is in contact with the bottom surface of the accommodating part 52a of the main poppet 50, the pressure in the compression pilot chamber 3 is adjusted.

The lower surface of the plunger rod support 42 of the pilot poppet 40 covers the first vertical pilot passage 6 extending from the bottom surface of the accommodating part 52a of the main poppet 50.

The lower surface of the plunger rod support 42 of the pilot poppet 40 is a pressed surface that is configured to be upwardly pressed by a working fluid introduced through the first vertical pilot passage 6 during a tensioning stroke.

The main poppet retainer 60 is formed in a disk shape having a rim portion protruding downward, and is horizontally disposed between the main poppet 50 and the control disk 70.

In the meantime, the main sheet 80 in which the hollow hole 82 is formed is coupled to the open lower end of the inner housing 30, and the ring-shaped control disk 70 is placed between the main sheet 80 and the main poppet retainer 60.

Hereinafter, it will be described in detail how a hard damping force is controlled in the internal type electronically controlled valve assembly according to some embodiments.

According to some embodiments, a damping force of a damper is adjustable based on an opening force of a main flow passage.

The opening force of the main flow passage is a resultant force of a force of a working fluid flowing along the main flow passage pushing the main poppet 50 upward and a force of the working fluid pushing the main poppet 50 downward.

According to some embodiments, the force pushing the main poppet 50 downward during a tension stroke acts in a different manner from that during a compression stroke.

During a tension stroke, the pressure of the tension pilot chamber 4, which varies depending on the movement of the pilot poppet 40, acts as a force pushing the main poppet 50 downward.

Hereinafter, the opening force of the main flow passage during the tension stroke will be described in detail.

During the tension stroke, a working fluid in the upper chamber 1 of the cylinder is introduced to a side of the main poppet 50 through the outer through hole 12 of the outer housing 10 and the first inner through hole 32 of the inner housing 30.

The introduced working fluid pressurizes the working fluid acting portion 54 at the lower end of the main poppet 50, and the main poppet 50 is pushed upward by the pressure of the working fluid since the outer circumferential surface of the working fluid acting portion 54 includes the inclined surface 54b.

The working fluid introduced through the outer through hole 12 of the outer housing 10 is introduced not only through the first inner through hole 32 of the inner housing 30 but also through the second inner through hole 34 communicating with the tension pilot chamber 4.

The working fluid introduced into the tension pilot chamber 4 through the second inner through hole 34 flows along the horizontal pilot passage 5 and the first vertical pilot passage 6 of the main poppet 50, and thus presses the pressed surface at the lower end of the pilot poppet 40 upward.

As the pilot poppet 40 is pushed upward by the working fluid, the passage between the pilot poppet 40 and the main poppet 50 is opened, so that the working fluid flows to the lower chamber 2 of the cylinder through the tension pilot passage.

Here, as the working fluid is introduced, a predetermined pressure is formed in the tension pilot chamber 4.

Meanwhile, when a control current is applied to the solenoid valve 20, the pilot poppet 40 is pressurized by the plunger rod 24 of the solenoid valve 20 and moves downward. The degree of the movement of the pilot poppet 40 is adjusted based on the amount of the control current.

According to the some embodiments, as the degree of downward movement of the pilot poppet 40 is controlled by controlling the amount of the control current applied to the solenoid valve 20, the pressure in the tension pilot chamber 4 is controlled.

Therefore, according to some embodiments, during the tension stroke, as the opening force of the main passage is controlled by controlling the pressure of the tension pilot chamber 4 based on the control current applied to the solenoid valve 20, a damping force is adjusted.

Accordingly, during the tension stroke, a resultant force of the pressure of the working fluid pushing up the main poppet 50 and the pressure of the tension pilot chamber 4, which varies depending on the movement of the pilot poppet 40, acts as the opening force of the main flow passage.

During the tension stroke, the main flow passage and the tension pilot passage communicate with the lower chamber 2 of the cylinder through the soft valve 90.

Meanwhile, unlike the above-described tension stroke, during the compression stroke, at least one of the pressure of the compression pilot chamber 3 or the thrust exerted by the actuation of the solenoid valve 20 acts as a force to push the main poppet 50 downward.

Hereinafter, the opening force of the main passage during the compression stroke will be described in detail.

During the compression stroke, a working fluid in the lower chamber 2 of the cylinder is introduced through the valve hole (not shown) of the soft valve 90.

The introduced working fluid provides a force for pushing the main poppet 50 upward by pressurizing the guide groove 54c of the main poppet 50.

At the same time, the working fluid flowing into the valve hole (not shown) of the soft valve 90 is introduced into the compression pilot passage formed on the upper side of the main poppet 50 along the second vertical pilot passage 7 in the main poppet body 52, thereby forming the pressure of the compression pilot chamber 3.

Because the diameter of the guide groove 54c of the main poppet 50 is larger than the diameter of the second vertical pilot passage 7 in the main poppet body 52, the pressure acting on the guide groove 54c to push up the main poppet 50 is greater than the pressure of the compression pilot chamber 3.

Here, the pilot poppet 40 is pushed downward by a working fluid flowing into the compression pilot chamber 3, blocking the first vertical pilot passage 6 and the flow of the working fluid.

Meanwhile, in this case, when a control current is applied to the solenoid valve 20, the plunger rod 24 of the solenoid valve 20 supports the pilot poppet 40 downward, so that the force supported by the pilot poppet 40 based on the control current of the solenoid valve 20 also acts as a force to push the main poppet 50 downward.

Therefore, according to the some embodiments, during the compression stroke, as the opening force of the main flow path is adjusted by the downward pressure applied to the main poppet 50 based on the pressure of the compression pilot chamber 3 and the control current applied to the solenoid valve 20, a damping force of a damper is adjusted.

Therefore, during the compression stroke, a resultant force of the pressure with which a working fluid pushes up the main poppet 50, the pressure in the compression pilot chamber 3, and the downward pressure applied to the main poppet 50 based on a control current applied to the solenoid valve 20 acts as the opening force of the main flow passage.

Figure 6:
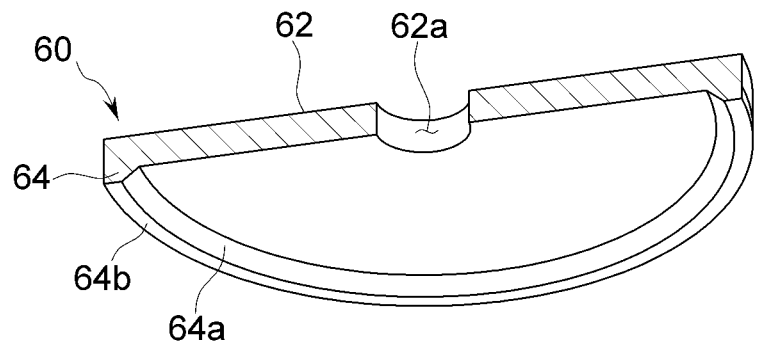
FIG. 6 is a partial perspective view of the main poppet retainer of the internal type electronically controlled valve assembly employed in the electronically controlled damper according to some embodiments.

FIG. 6 is a partial perspective view of the main poppet retainer of the internal type electronically controlled valve assembly employed in the electronically controlled damper according to some embodiments.

The main poppet retainer 60 includes the disk-shaped body 62 having the fitting hole 62a formed in the center thereof and a protrusion 64 protruding downward along the rim of the body 62.

Here, the protrusion 64 includes an inner circumferential surface 64a inclined outward and downward from the bottom of the rim of the body 62 and a bottom surface 64b extending outward from the inner circumferential surface 64a. The bottom surface 64b is flat.

In addition, in some embodiments, a diameter of the main poppet retainer 60 is smaller than a diameter of the control disk 70. Further in some embodiments, the main poppet retainer 60 is spaced apart from the control disk 70.

During a compression stroke, while a working fluid introduced through the hollow hole 82 of the main sheet 80 flows between the control disk 70 and the main poppet retainer 60, the pressure of the working fluid is lowered by the protrusion 64 of the main poppet retainer 60 (the pressure is lowered as the gap between the control disk 70 and the protrusion 64 narrows), and then the working fluid flows into the second vertical pilot passage 7 in the main poppet 50.

Figure 7:
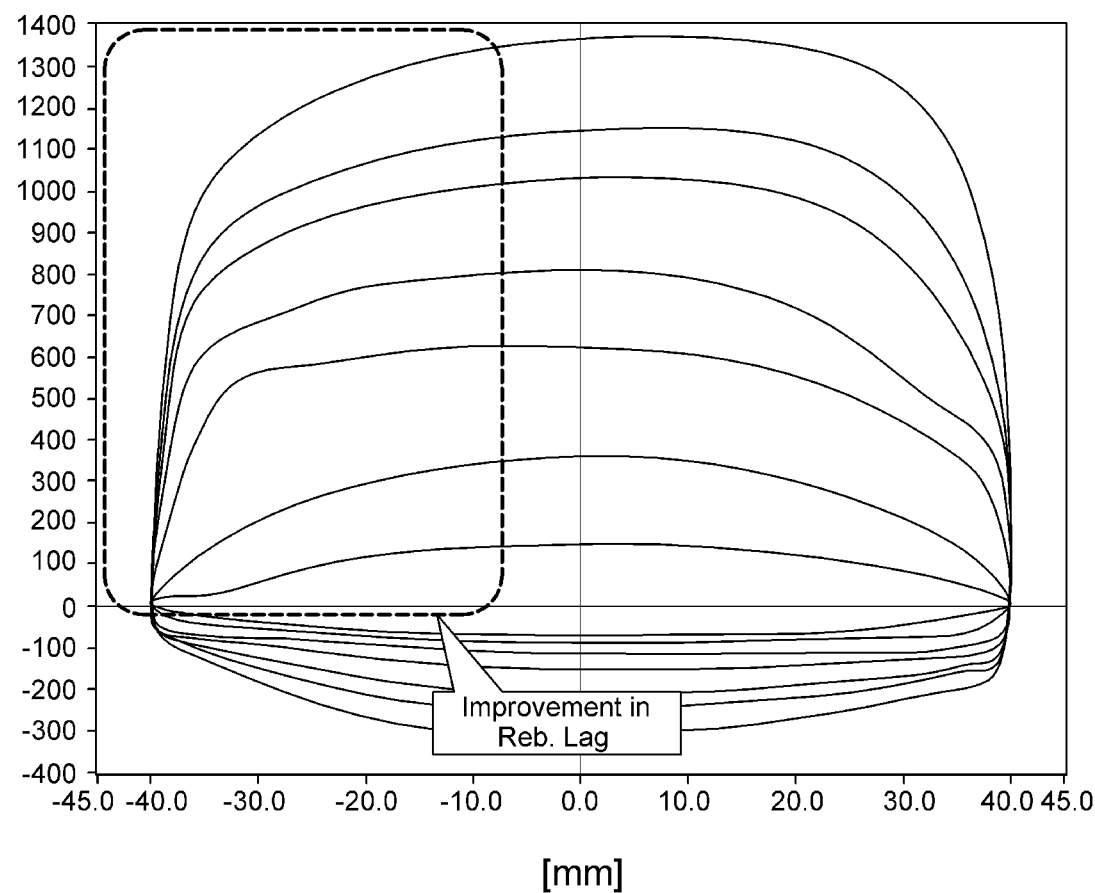
FIG. 7 is an F-S diagram showing that rebound lag is improved when a damping force of the internal type electronically controlled valve assembly according to some embodiments becomes degressive at a high flow rate in a hard mode during a compression stroke.
Figure 8:
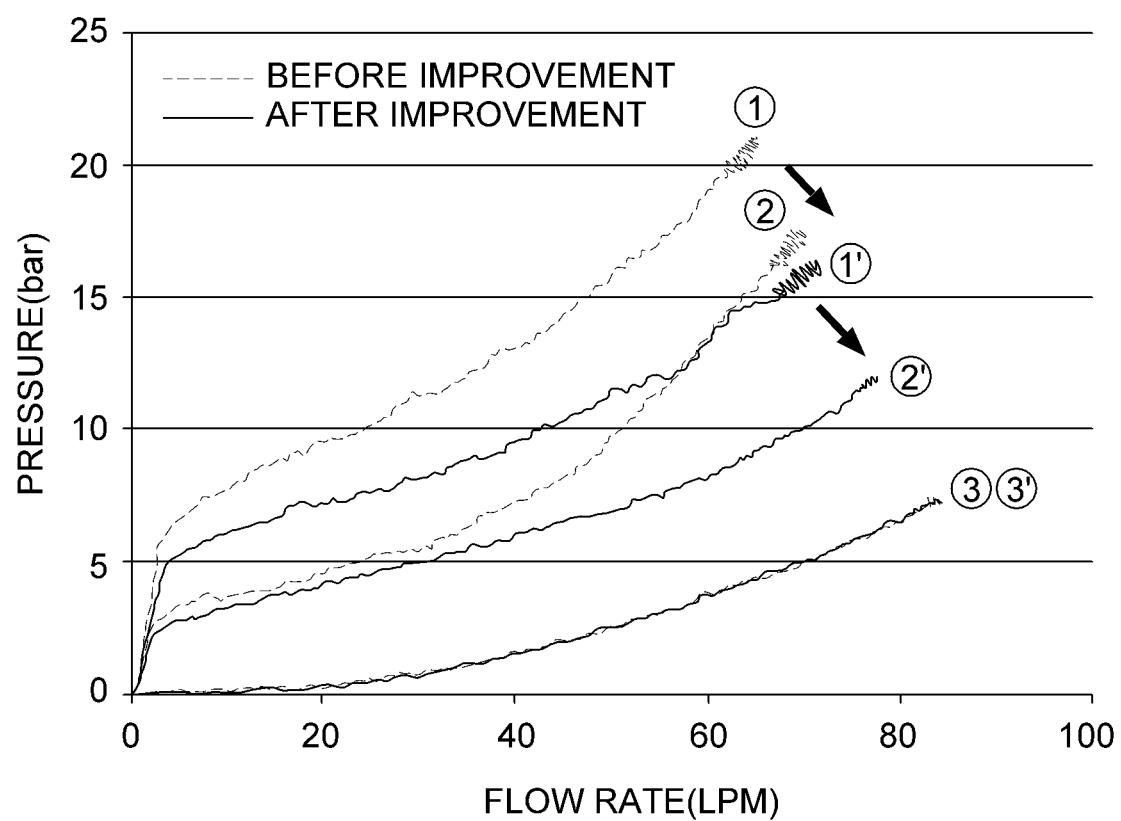
FIG. 8 is a graph showing the relationship between pressure and flow rate in a hard mode, a medium mode, and a soft mode during a compression stroke of the internal type electronically controlled valve assemblies respectively according to the related art and some embodiments.

FIG. 7 is an F-S diagram showing that rebound lag is improved when a damping force of the internal type electronically controlled valve assembly according to some embodiments becomes degressive at a high flow rate in a hard mode during a compression stroke. FIG. 8 is a graph showing the relationship between pressure and flow rate in a hard mode, a medium mode, and a soft mode during a compression stroke of the internal type electronically controlled valve assemblies respectively according to the related art and the some embodiments.

The horizontal axis in FIG. 7 indicates the vertical displacement of a piston rod inside a cylinder of a damper to which the internal type electronically controlled valve assembly 2000 is assembled.

In addition, the vertical axis in FIG. 7 indicates the load generated by the resistance of the valve assembly mounted on the end of the piston rod, and the load generated at the end of the piston rod is measured with a load cell.

Because the flow path connected to the pilot chamber of the internal type electronically controlled valve assembly is narrowed by the main poppet retainer 60, during a compression stroke, a damping force is degressive when a flow rate increases.

In other words, while a working fluid introduced through the hollow hole 82 of the main sheet 80 flows between the control disk 70 and the main poppet retainer 60, the pressure of the working fluid is lowered, and the working fluid flows into the second vertical pilot passage 7 formed in the main poppet 50.

Consequently, it is possible for the working fluid to sufficiently flow into the upper chamber 1 of the cylinder so that rebound lag in a conventional hard mode is improved.

Accordingly, as shown in the upper left corner of the F-S diagram in FIG. 7, during a tension stroke, energy loss is significantly reduced, and the driving performance of the vehicle is also stabilized.

In FIG. 8, the lines denoted by numerals "1" and "1'" represent the relationship between pressure and flow rate in a hard mode, the lines denoted by numerals "3" and "3'" represent the relationship between pressure and flow rate in a soft mode, and the lines denoted by numerals "2" and "2'" represent the relationship between pressure and flow rate in a medium mode between the hard mode and the soft mode.

The pressure-flow rate graph in FIG. 8 can be obtained by a predetermined test equipment, where the flow rate is an input value and the pressure is an output value.

That is, FIG. 8 is a graph showing a value of pressure obtained in real time when a working fluid passes through a valve assembly.

The dotted line denoted by numeral "1" and the dotted line denoted by numeral "2" are for the conventional internal type electronically controlled valve assembly in which a main poppet retainer is not installed, and show a progressive change with a steep slope.

In contrast, the solid line denoted by numeral "1'" and the solid line denoted by numeral "2'" are for the internal type electronically controlled valve assembly having a main poppet retainer according to some embodiments, and show a degressive change with a gentle slope.

As such, according to the present disclosure, since the main poppet retainer 60 formed in a disc shape with a rim protruding downward and disposed horizontally between the main poppet 50 and the control disc 70 is included, during a compression stroke, a working fluid introduced through the hollow hole 82 of the main sheet 80 passes between the control disk 70 and the main poppet retainer 60, reducing the pressure, and then flows into the second vertical pilot passage 7 formed in the main poppet 50, thereby significantly reducing the pressure of the compression pilot chamber 3.

Accordingly, it is possible to prevent rebound lag during a compression stroke, thereby preventing energy loss during a tension stroke and achieving a stable driving of a vehicle.

The present disclosure described above is not limited by the foregoing embodiments and the accompanying drawings, and it will be clearly understood by a person having ordinary skill in the art that various substitutions, modifications, and changes are possible within the scope of the technology of the present disclosure.

What is claimed is:

1. An internal type electronically controlled valve assembly, comprising:
    an outer housing that is configured to move up and down inside a cylinder and partitions the cylinder into an upper chamber and a lower chamber;
    a solenoid valve at a top of an inner space of the outer housing;
    an inner housing disposed below the solenoid valve inside the outer housing to form a main flow passage through which the upper chamber and the lower chamber of the cylinder communicate with each other;
    a main poppet disposed movably up and down inside the inner housing to open and close the main flow passage, the main poppet including a pilot passage;
    a pilot poppet having at least a lower half portion accommodated in an upper part of the main poppet, the pilot poppet being configured to adjust an opening force of the main flow passage based on a control current applied to the solenoid valve;
    a main sheet having a hollow hole at a center of the main sheet, the main sheet being coupled to an open lower end of the inner housing to limit a downward movement of the main poppet;
    a control disk having a ring shape and disposed horizontally above the main sheet; and
    a main poppet retainer having a disc shape with a rim protruding downward and disposed horizontally between the main poppet and the control disk,
    wherein, the internal type electronically controlled valve assembly is configured such that, during a compression stroke, a working fluid introduced through the hollow hole of the main sheet passes between the control disk and the main poppet retainer, reducing the pressure, and then flows into the pilot passage in the main poppet, and
    wherein a central region of a bottom surface of the main poppet is in direct contact with a top surface of the main poppet retainer, and a peripheral region of the bottom surface of the main poppet is free of contact with the top surface of the main poppet retainer.

2. The internal type electronically controlled valve assembly of claim 1, wherein the main poppet retainer includes:
    a disc-shaped body with a fitting hole formed in the center; and
    a protrusion protruding downward along the rim of the disc-shaped body.

3. The internal type electronically controlled valve assembly of claim 2, wherein the protrusion includes:
    an inner circumferential surface inclined outward and downward from a bottom of the rim of the disc-shaped body; and
    a bottom surface extending outward from the inner circumferential surface.

4. The internal type electronically controlled valve assembly of claim 2, further comprising a fitting member in a rod shape with a predetermined length extending from a center of a lower surface of the main poppet,
    wherein the fitting member is inserted into a fitting hole formed in a body of the main poppet retainer and a coupling hole formed in a center of the control disk.

5. The internal type electronically controlled valve assembly of claim 1, wherein
    a diameter of the main poppet retainer is smaller than a diameter of the control disk, and
    the main poppet retainer is disposed to be spaced apart from the control disk.

6. The internal type electronically controlled valve assembly of claim 1, further comprising a soft valve coupled to a lower part of the outer housing.

7. The internal type electronically controlled valve assembly of claim 1, wherein
    the main flow passage is formed along an outer through hole formed in the outer housing and a first inner through hole formed at a height corresponding to that of the outer through hole in the inner housing, and
    the main flow passage is configured to be opened and closed based on a pressure of the working fluid pushing the main poppet upward.

8. The internal type electronically controlled valve assembly of claim 1, wherein
    a tension pilot chamber is formed between an inner circumferential surface of the inner housing and a side portion of the main poppet, and,
    the internal type electronically controlled valve is configured such that, during a tension stroke, as the pilot poppet moves up and down based on the control current, the opening force of the main flow passage is adjusted.

9. The internal type electronically controlled valve assembly of claim 1, wherein
    a compression pilot chamber is formed on the upper side of the pilot poppet, and
    the internal type electronically controlled valve is configured such that, during a compression stroke, the opening force of the main flow passage is controlled by the force supported by the pilot poppet based on the control current.

10. The internal type electronically controlled valve assembly of claim 1, wherein
    the main poppet includes
        an accommodating part for accommodating the pilot poppet,
        a main poppet body in which a main poppet passage forming the pilot passage is formed, and
        a working fluid acting portion that extends from the lower end of the main poppet body and is configured to be pressurized by the working fluid to open and close the main flow passage.

11. The internal type electronically controlled valve assembly of claim 10, wherein the main poppet passage includes
    a horizontal pilot passage communicating with a tension pilot chamber,
    a first vertical pilot passage having a lower end connected to the horizontal pilot passage and an upper end connected to the accommodating part, and
    a second vertical pilot passage penetrating the main poppet body in a vertical direction.

12. The internal type electronically controlled valve assembly of claim 11, wherein, in response to the pilot poppet being pushed upward, the first vertical pilot passage communicates with the second vertical pilot passage.

13. The internal type electronically controlled valve assembly of claim 12, wherein the pilot poppet includes
a plunger rod support on which an end of a plunger rod of the solenoid valve is seated, and
a guide passage through which the first vertical pilot passage communicates with the second vertical pilot passage.

14. The internal type electronically controlled valve assembly of claim 10, wherein the working fluid acting portion includes
a guide wall protruding downward from the bottom surface of the main poppet, and
a guide groove formed inward of the guide wall in a radial direction.

15. The internal type electronically controlled valve assembly of claim 14, wherein
during a tension stroke, an outer circumferential surface of the guide wall is configured to be pressed by the working fluid, and
during a compression stroke, the guide groove is configured to be pressed by the working fluid.

16. The internal type electronically controlled valve assembly of claim 15, wherein the outer circumferential surface of the guide wall slopes upward toward an outer side of the main poppet in the radial direction.

17. An internal type electronically controlled valve assembly, comprising:
an outer housing that is configured to move up and down inside a cylinder and partitions the cylinder into an upper chamber and a lower chamber;
an inner housing disposed inside the outer housing to form a main flow passage through which the upper chamber and the lower chamber of the cylinder communicate with each other;
a main poppet disposed movably up and down inside the inner housing to open and close the main flow passage, the main poppet including a pilot passage;
a pilot poppet having at least a lower half portion accommodated in an upper part of the main poppet, the pilot poppet being configured to adjust an opening force of the main flow passage based on a control current applied to a solenoid valve;
a main sheet having a hollow hole at a center of the main sheet and coupled to an open lower end of the inner housing to limit a downward movement of the main poppet;
a control disk having a ring shape and disposed horizontally above the main sheet; and
a main poppet retainer disposed horizontally between the main poppet and the control disk and having a disc shape with a rim protruding downward to allow a working fluid introduced through the hollow hole of the main sheet and having a reduced pressure to flow into the pilot passage formed in the main poppet during a compression stroke,
wherein a central region of a bottom surface of the main poppet is in direct contact with a top surface of the main poppet retainer, and a peripheral region of the bottom surface of the main poppet is free of contact with the top surface of the main poppet retainer.

18. The internal type electronically controlled valve assembly of claim 17, wherein
the main flow passage is formed along an outer through hole formed in the outer housing and a first inner through hole formed at a height corresponding to that of the outer through hole in the inner housing, and
the main flow passage is configured to be opened and closed based on the pressure of the working fluid pushing the main poppet upward.

19. The internal type electronically controlled valve assembly of claim 17, wherein
the main poppet retainer includes
a disc-shaped body with a fitting hole formed in a center of the main poppet retainer and
a protrusion protruding downward along the rim of the body,
a diameter of the main poppet retainer is smaller than a diameter of the control disk, and
the main poppet retainer is disposed to be spaced apart from the control disk.

20. An electronically controlled damper comprising the internal type electronically controlled valve assembly of claim 1.

* * * * *